(12) United States Patent
Niimi

(10) Patent No.: US 8,290,652 B2
(45) Date of Patent: Oct. 16, 2012

(54) CONTROL APPARATUS AND METHOD FOR HYBRID VEHICLE

(75) Inventor: Kuniaki Niimi, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 615 days.

(21) Appl. No.: 12/562,238

(22) Filed: Sep. 18, 2009

(65) Prior Publication Data

US 2010/0070122 A1 Mar. 18, 2010

(30) Foreign Application Priority Data

Sep. 18, 2008 (JP) ................................. 2008-239178

(51) Int. Cl.
*G06F 19/00* (2006.01)
(52) U.S. Cl. .......................................... 701/22; 307/9.1
(58) Field of Classification Search .................... 701/22; 307/9.1, 10.1, 10.6, 10.7
See application file for complete search history.

(56) References Cited

U.S. PATENT DOCUMENTS

| | | | | |
|---|---|---|---|---|
| 2007/0262749 A1* | 11/2007 | Luan et al. | .................... | 320/132 |
| 2008/0078593 A1* | 4/2008 | Ortmann et al. | ............. | 180/65.2 |
| 2008/0147294 A1 | 6/2008 | Tomatsuri et al. | | |
| 2010/0070122 A1* | 3/2010 | Niimi | .............................. | 701/22 |
| 2011/0276213 A1* | 11/2011 | Tomatsuri | ....................... | 701/22 |

FOREIGN PATENT DOCUMENTS

| | | |
|---|---|---|
| JP | 4123707 A | 5/2008 |
| JP | 2008151064 A | 7/2008 |

* cited by examiner

*Primary Examiner* — Yonel Beaulieu
(74) *Attorney, Agent, or Firm* — Gifford, Krass, Sprinkle, Anderson & Citkowski, P.C.

(57) ABSTRACT

A control apparatus for a hybrid vehicle, which outputs motive power to a drive shaft from an internal combustion engine and motor generators as motive power sources, including: a recirculating gas control portion that performs valve opening control on a recirculation valve so that an amount of recirculating exhaust reaches a control target valve, and that closes the recirculation valve completely when a deceleration request by a driver is detected; a throttle control portion that performs valve closing control on a throttle valve so that the amount of air circulating through an intake pipe decreases at a predetermined speed when the deceleration request issued by the driver is detected; and a braking control portion that controls regenerative braking forces of the motor generators so that at least one of the motor generators absorbs the motive power generated by the engine while valve closing control is executed on the throttle valve.

16 Claims, 9 Drawing Sheets

CONTROL APPARATUS AND METHOD FOR HYBRID VEHICLE

INCORPORATION BY REFERENCE

The disclosure of Japanese Patent Application No. 2008-239178 filed on Sep. 18, 2008 including the specification, drawings and abstract is incorporated herein by reference in its entirety.

BACKGROUND OF THE INVENTION

1. Field of the Invention

The invention relates to a control apparatus and method for a hybrid vehicle, and particularly to a control apparatus and method for a hybrid vehicle having an internal combustion engine and an electric motor as motive power sources.

2. Description of the Related Art

Hybrid vehicles that are driven by efficiently combining an internal combustion engine (engine) and an electric motor (motor) have been practically used in consideration of the environmental problems. As the engine installed in such hybrid vehicles, Japanese Patent Application Publication No. 2008-151064 (JP-A-2008-151064), for example, discloses the engine provided with an exhaust gas recirculation (to be referred to as Exhaust Gas Recirculation (EGR) hereinafter) device that recirculates some of the exhaust gas within an exhaust passage to an intake passage again.

This EGR device recirculates some of the exhaust gas discharged from the engine into the intake system, and reduces the combustion temperature by mixing the exhaust gas with new air-fuel mixture to thereby prevent the generation of nitrogen oxide (NOx) or to improve fuel efficiency by suppressing pumping loss.

From the perspective of further improvement of fuel efficiency, in the abovementioned engine provided with the EGR device, increasing the amount of exhaust gas (EGR gas) recirculated into the intake system, that is, increasing the EGR rate indicating a rate of the EGR gas amount with respect to the amount of intake air introduced into a cylinder, is taken into consideration. Increasing the EGR rate allows not only combustion to take place at a stoichiometric air-fuel ratio when the concentrations of the fuel and the oxygen are low, but also the combustion heat to be absorbed by the exhaust in the air-fuel mixture, so that increase in the amount of fuel consumption for adjusting the temperature of the exhaust gas can be suppressed.

On the other hand, in the EGR device, it is necessary to increase the diameter of an EGR pipe introducing the exhaust gas that has passed through a three-way catalytic converter into an EGR valve or to increase the size of the EGR valve, in order to realize high EGR rate. The problem in increasing the diameter of the EGR pipe or the size of the EGR valve is that the control responsiveness in controlling the opening of the EGR valve is reduced.

Specifically, in a case in which engine stop control is performed in response to a deceleration requirement from a driver, even when a valve closing signal is output to the EGR valve, a predetermined response time period is required until the EGR valve is actually completely closed, due to the impairment in the responsiveness of the EGR valve. For this reason, the EGR gas is continuously introduced into the intake pipe during the response time period. Furthermore, by performing valve closing control on a throttle valve, the amount of intake air is reduced and the negative pressure in the intake pipe rises, whereby the amount of recirculating EGR gas increases. In addition, the EGR gas recirculated into the inside of the intake pipe during the response time period remains in the intake pipe without being discharged into the combustion chamber by fresh air.

When the amount of the EGR gas left in the intake pipe increases, the amount of combustible air substantially decreases as the residual amount of the EGR gas increases. Thus the air-fuel ratio falls out of a combustible mixture ratio, thereby occurring a so-called misfire, which is a phenomenon in which the air-fuel mixture within the combustion chamber is not ignited. When a misfire occurs, the engine rotational speed decreases, deteriorating the drivability. Another problem is that there is a negative influence on an exhaust emission control catalyst when unburned air-fuel mixture is discharged to the exhaust passage.

SUMMARY OF THE INVENTION

The present invention provides a control apparatus and method for a hybrid vehicle capable of achieving both improvement of fuel efficiency and high drivability by obtaining a high EGR rate.

A first aspect of the invention relates to a control apparatus for a hybrid vehicle, which outputs motive power to a drive shaft from an internal combustion engine and a motor generator as motive power sources. The hybrid vehicle has: a first motor generator capable of generating electricity by receiving the motive power from the internal combustion engine; a motive power dividing mechanism that is configured to mechanically distribute the motive power from the internal combustion engine to the first motor generator and the drive shaft; a second motor generator, a rotating shaft of which is coupled to the drive shaft; and an electric storage device capable of sending and receiving power to and from the first and second motor generators. The internal combustion engine is provided with an exhaust gas recirculation device for recirculating part of exhaust gas to an intake pipe of the internal combustion engine via a recirculation valve, and is provided with a throttle valve that changes an amount of air circulating through the intake pipe. The control apparatus has: a recirculating gas control portion that performs valve opening control on the recirculation valve so that the amount of recirculating exhaust reaches a control target value, and that closes the recirculation valve completely when a deceleration request issued by a driver is detected; a throttle control portion that performs valve closing control on the throttle valve so that the amount of air decreases at a predetermined deceleration speed when the deceleration request issued by the driver is detected; and a braking control portion that controls regenerative braking forces of the first and second motor generators so that at least one of the first and second motor generators absorbs the motive power generated by the internal combustion engine while valve closing control is executed on the throttle valve.

A second aspect of the invention relates to a control method for a hybrid vehicle, which outputs motive power to a drive shaft from an internal combustion engine and a motor generator as motive power sources. The hybrid vehicle has: a first motor generator capable of generating electricity by receiving the motive power from the internal combustion engine; a motive power dividing mechanism that is configured to mechanically distribute the motive power from the internal combustion engine to the first motor generator and the drive shaft; a second motor generator, a rotating shaft of which is coupled to the drive shaft; and an electric storage device capable of sending and receiving power to and from the first and second motor generators. The internal combustion engine is provided with an exhaust gas recirculation device for recirculating part of exhaust gas to an intake pipe of the internal combustion engine again via a recirculation valve, and is provided with a throttle valve that changes the amount of air circulating through the intake pipe. The control method includes: performing valve opening control on the recirculation valve so that the amount of recirculating exhaust reaches a control target valve, while closing the recirculation valve completely when a deceleration request issued by a driver is detected; performing valve closing control on the throttle valve so that the amount of air decreases at a predetermined deceleration speed when the deceleration request issued by the driver is detected; and controlling regenerative braking forces of the first and second motor generators so that at least one of the first and second motor generators absorbs the motive power generated by the internal combustion engine while valve closing control is executed on the throttle valve.

According to this invention, both improvement of fuel efficiency and drivability can be suitably achieved by obtaining a high EGR rate.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements, and wherein.

DETAILED DESCRIPTION OF EMBODIMENTS

Figure 1:
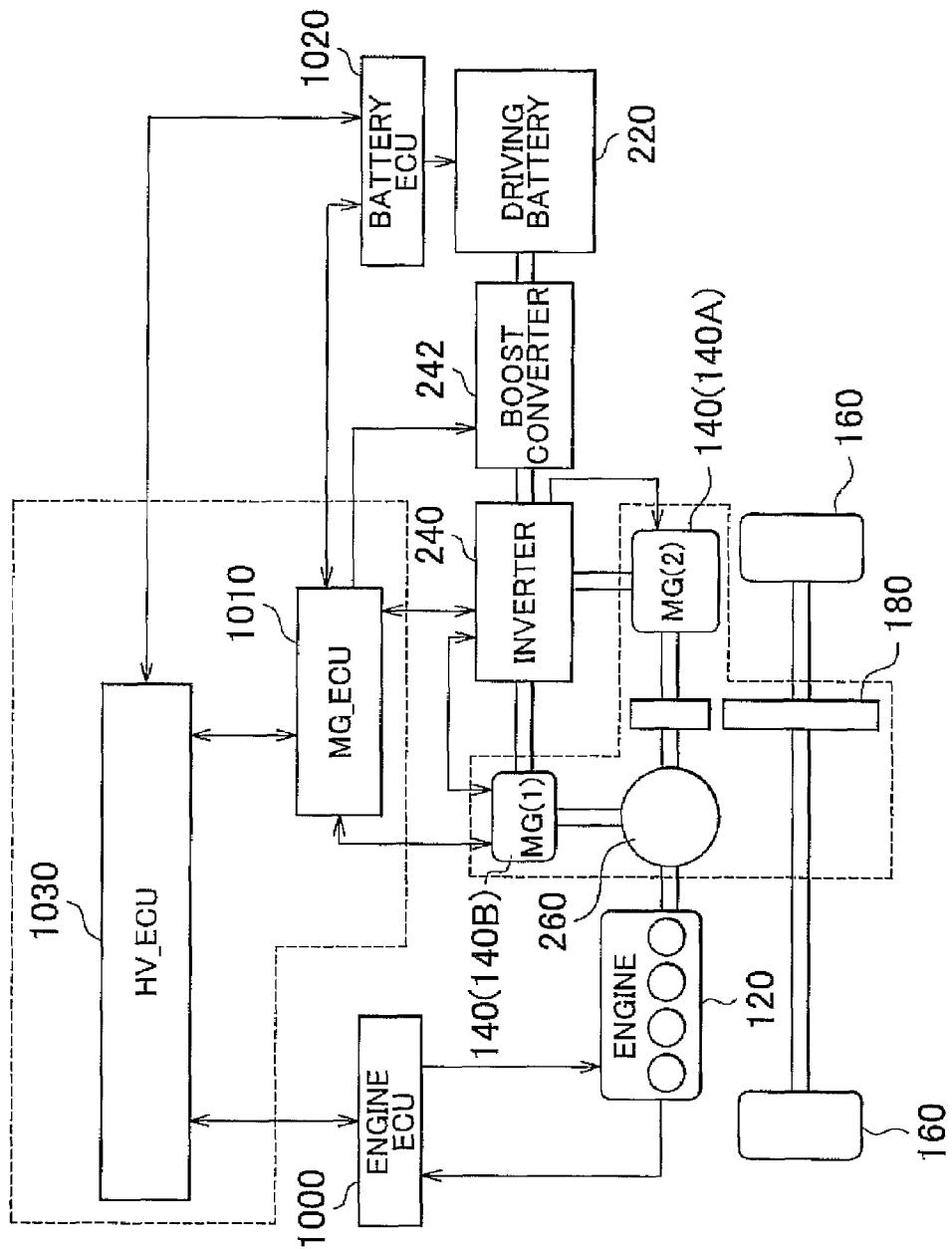
FIG. 1 is a block diagram for illustrating the configuration of a hybrid vehicle installed with a control apparatus of an internal combustion engine according to an embodiment of the invention.

An embodiment of the invention will be described hereinafter in detail with reference to the drawings. Note that the same reference numerals shown in diagrams denote the equivalent or relevant sections.

FIG. 1 is a block diagram for illustrating the configuration of a hybrid vehicle shown as an example of a vehicle installed with a control apparatus according to the embodiment of the invention. Note that the invention is not restricted to the hybrid vehicle shown in FIG. 1.

The hybrid vehicle has, as the motive power sources, an internal combustion engine (to be referred to as "engine" hereinafter) 120 such as a gasoline engine or a diesel engine, and a MG 140. In FIG. 1, the MG 140 is expressed as a "motor 140A" and a "generator 140B (or "MG 140B")" for convenience of explanation, as the motor 140A functions as the generator and the generator 140B as the motor, depending on the traveling state of the hybrid vehicle.

In addition to the MG 140, the hybrid vehicle has a reducer 180 that transmits motive power generated by the engine 120 or MG 140 to a drive wheel 160 or transmits the drive of the drive wheel 160 to the engine 120 or MG 140, a motive power dividing mechanism (e.g., a planetary gear mechanism) 260 that distributes the motive power generated by the engine 120 to the drive wheel 160 and the generator 140B, a driving battery 220 that charges electricity for driving the MG 140, an inverter 240 that carries out current control while converting a direct current of the driving battery 220 and an alternate current of the motor 140A and the generator 140B, a boost converter 242 that converts voltage between the driving battery 220 and the inverter 240, a battery control unit (to be referred to as "battery ECU" hereinafter) 1020 that manages and control a charge/discharge state of the driving battery 220, an engine ECU 1000 that controls an operating state of the engine 120, an MG_ECU 1010 that controls the MG 140, the battery ECU 1020, the inverter 240 and the like in accordance with a state of the hybrid vehicle, and an HV_ECU 1030 that manages and controls the battery ECU 1020, the engine ECU 1000 and the MG_ECU 1010 reciprocally to control the entire hybrid system so that the hybrid vehicle can run most efficiently.

Note that the battery ECU 1020, the engine ECU 1000, the MG_ECU 1010, and the HV_ECU 1030 can correspond to the "control apparatus" of the invention. In FIG. 1, these ECUs have different configurations but may be configured by integrating two or more ECUs (for example, the ECU obtained by integrating the MG_ECU 1010 and the HV_ECU 1030, as shown by the dotted lines in FIG. 1).

As the motive power dividing mechanism 260, a planetary gear mechanism (planetary gear) is used for dividing motive power of the engine 120 into both the drive wheel 160 and the MG 140B. The motive power dividing mechanism 260 functions as a continuously variable transmission by controlling the rotational speed of the MG 140B. In the motive power dividing mechanism 260 the rotational force of the engine 120 is input to the planetary gear (C) and transmitted to the MG 140B by a sun gear (S) and to the motor and an output shaft (on the drive wheel 160 side) by a ring gear (R). When stopping the rotating engine 120, the kinetic energy of this rotation is converted into electrical energy by the MG 140B to reduce the rotational speed of the engine 120.

In the hybrid vehicle installed with the hybrid system shown in FIG. 1, when the engine 120 is inefficient at startup and during low-speed running, the hybrid vehicle is caused to travel only by the motor 140A of the MG 140. During normal traveling, the motive power of the engine 120 is divided into two paths by, for example, the motive power dividing mechanism 260, wherein one of the paths directly drives the drive wheel 160 and the other drives the generator 140B to generate electricity. In so doing, the motor 140A is driven by the generated electricity, to auxiliary drive the drive wheel 160. During high-speed running, electricity from the driving battery 220 is supplied to the motor 140A to increase the output of the motor 140A, whereby drive force is added to the drive wheel 160. During deceleration, on the other hand, the motor 140A that is driven by the drive wheel 160 functions as the generator to generate regenerative electricity and accumulate the recovered electricity in the driving battery 220. When the charged amount of the driving battery 220 is lowered and therefore charging needs to be taken place particularly, the output of the engine 120 is increased to increase the amount of electricity to be generated by the generator 140B, so that the charged amount of the driving battery 220 is increased. Naturally, during low-speed running, control for increasing the amount of drive of the engine 120 is carried out as necessary, such as when the driving battery for running 220 needs to be charged as described above, when an air-conditioner or other auxiliary machinery is driven, and when the temperature of the coolant of the engine 120 is raised to a predetermined temperature.

Figure 2:
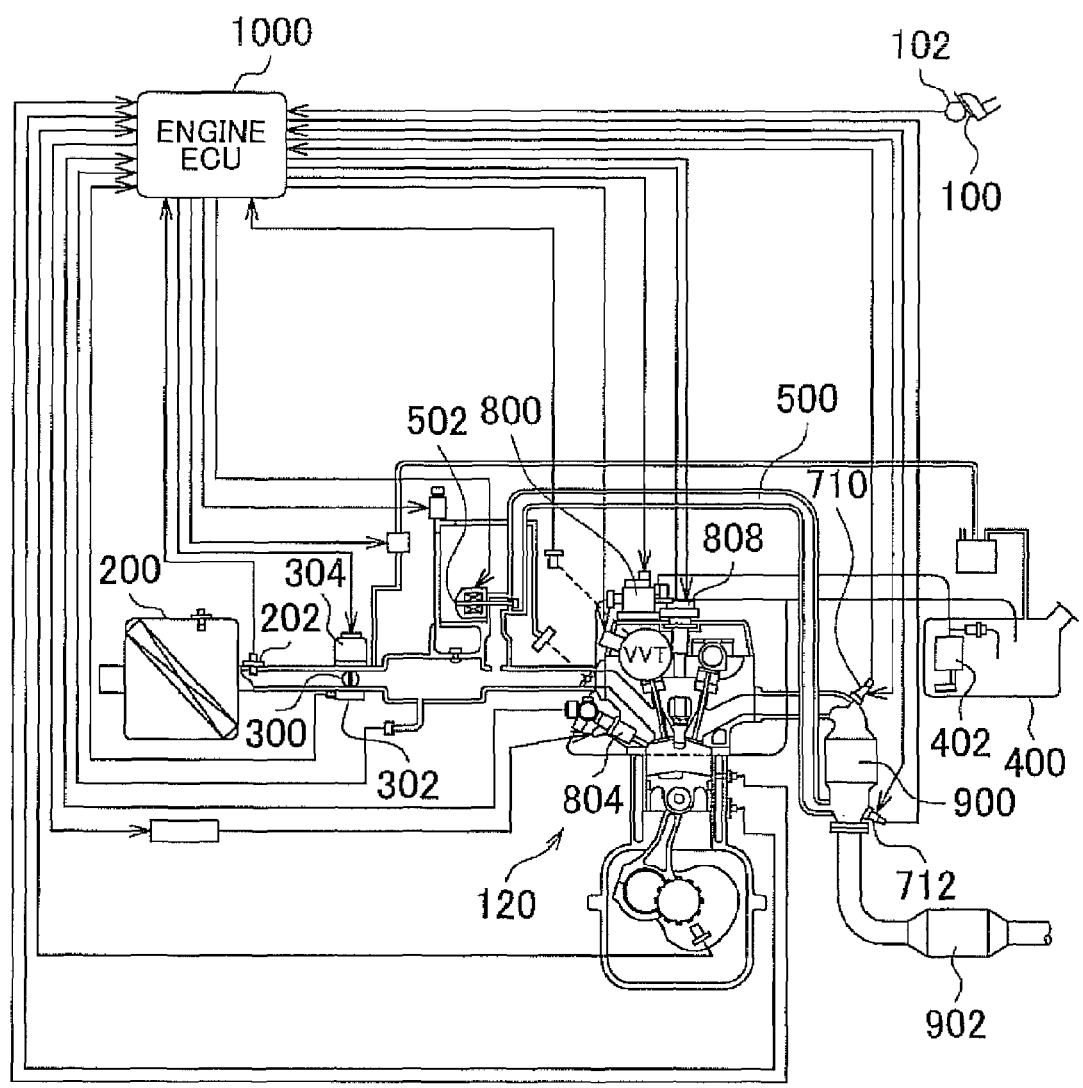
FIG. 2 is a schematic configuration diagram of an engine system that is controlled by an engine electronic control unit (ECU), which is the control apparatus of the internal combustion engine according to the embodiment of the invention.

Next is described the engine 120 that is controlled by the engine ECU 1000 functioning as the control apparatus of the internal combustion engine according to the embodiment of the invention. FIG. 2 is a schematic configuration diagram of an engine system that is controlled by the engine ECU 1000.

Referring to FIG. 2, in this engine system, air that passes through an air cleaner 200 is introduced into a combustion chamber of the engine 120. Here, an intake air amount is detected by an airflow meter 202 and then a signal indicating the amount of intake air is input to the engine ECU 1000. Further, the amount of intake air is changed by the opening of a throttle valve 300. The opening of the throttle valve 300 is changed by a throttle motor 304 activated based on a signal from the engine ECU 1000. The opening of the throttle valve 300 is detected by a throttle position sensor 302, and a signal indicating the opening of the throttle valve 300 is input to the engine ECU 1000.

Fuel is stored in a fuel tank 400 and injected by a fuel pump 402 from a high-pressure fuel injector 804 into the combustion chamber via a high-pressure fuel pump 800. Air-fuel mixture consisting of air introduced from an intake manifold and the fuel injected from the fuel tank 400 to the combustion chamber via the high-pressure fuel injector 804 is ignited by an igniter-integrated ignition coil 808 receiving a control signal from the engine ECU 1000, and the air-fuel mixture burns. In addition to such a configuration where a cylinder injector for injecting the fuel into a cylinder is provided as shown in FIG. 2, the configuration may be such that an intake passage injector for injecting fuel into an intake port and/or an intake passage is provided or such that both of the cylinder injector and the intake passage injector are provided.

The exhaust gas resulting from combustion of the air-fuel mixture passes through an exhaust manifold and emitted into atmosphere through a three-way catalytic converter 900 and a three-way catalytic converter 902.

As shown in FIG. 2, the engine system has an EGR device that uses an EGR valve 502 to control a flow rate of the EGR gas flowing from the downstream of the three-way catalytic converter 900 through an EGR pipe 500. The EGR device is referred to as an exhaust gas recirculation device, and it aims at improvement of fuel efficiency by suppressing generation of NOx and suppressing pumping loss, by recirculating a part of the exhaust gas emitted from the engine 120 to an intake system and mixing the exhaust gas with new air-fuel mixture to lower a combustion temperature.

Figure 3:
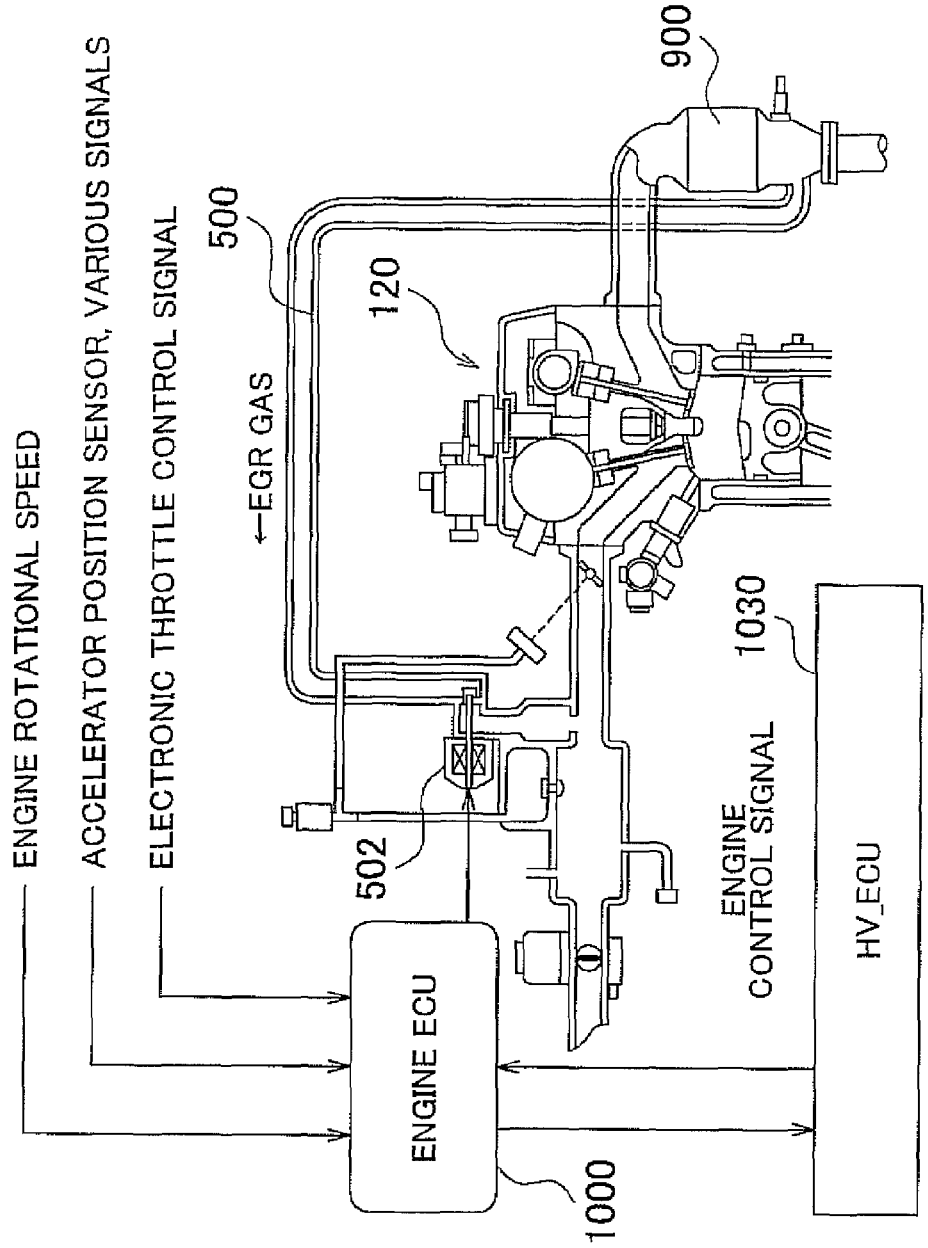
FIG. 3 is a diagram showing an enlarged view of the EGR device shown in FIG. 2.

FIG. 3 is a diagram showing an enlarged view of the EGR device shown in FIG. 2. As shown in FIG. 3, the exhaust gas that has passed through the three-way catalytic converter 900 is introduced to the EGR valve 502 through the EGR pipe 500. The engine ECU 1000 carries out duty control on the EGR valve 502. The engine ECU 1000 controls the opening of the EGR valve 502 based on the engine rotational speed and various signals such as a signal from an accelerator position sensor 102 (FIG. 2).

Although not shown, the EGR valve 502 has a stepper motor operated by the control signal from the engine ECU 1000, a poppet valve, the opening of which is controlled linearly by the stepper motor, and a return spring. Because the temperature of the EGR gas recirculated to the combustion chamber is high, the EGR gas adversely affects the performance or durability of the EGR valve 502. Therefore, a coolant passage for cooling with the engine coolant is provided.

The HV_ECU 1030 receives a signal indicating the engine rotational speed detected by an engine rotational speed sensor (not shown) and a signal from the accelerator position sensor 102, via the engine ECU 1000. Furthermore, the HV_ECU 1030 receives a signal indicating a vehicle speed detected by a wheel speed sensor (not shown). The HV_ECU 1030 outputs an engine control signal (a throttle opening signal, for example) to the engine ECU 1000 based on these signals.

The engine ECU 1000 outputs an electronic throttle control signal to the engine 120, based on the engine control signal or other control signals. In addition, the engine ECU 1000 generates a control signal for adjusting the opening of the EGR valve 502 based on the operating state of the engine 120 by means of a method which will be described later, and outputs the generated control signal to the stepper motor.

In this embodiment, although the EGR valve 502 in the EGR device has been described as a valve in which the poppet valve is driven by the stepper motor, the invention is not limited thereto. For example, a pneumatic control EGR valve configured by a solenoid valve and an pneumatic actuator having a diaphragm may be employed, instead of an electric actuator such as the stepper motor.

Referring to FIG. 2 again, in addition to such an EGR device, the following systems are introduced in the engine system.

In the engine system, a fuel injection control system is introduced. The airflow meter 202 and a vacuum sensor 306 detect the amount of intake air, whereby the fuel injection amount is controlled. The engine ECU 1000 controls the fuel injection amount and fuel injection timing in accordance with an engine rotational speed and engine load so as to attain an optimal combustion state, based on a signal from each sensor.

In addition, in the engine system, the fuel injection amount is determined based on the engine rotational speed and the amount of intake air detected by the vacuum sensor 306 and airflow meter 202. Moreover, an air-fuel ratio after the start of the engine is subjected to feedback control based on a signal from oxygen sensors 710 and 712. In other words, in fuel injection control, fuel injection timing control and injection amount control are executed by correcting, based on the signal from each sensor, basic injection time period computed in accordance with the state of the engine 120.

Moreover, an ignition timing control system is introduced in this engine system. The engine ECU 1000 calculates optimal ignition timing based on the signal from each sensor and outputs an ignition signal to the igniter-integrated ignition coil 808. The ignition timing is determined based on initially set ignition timing or on a basic advance angle and a corrected advance angle.

The engine ECU 1000 calculates the ignition timing of the engine 120 in accordance with the operating state thereof, based on the engine rotational speed signal, a signal from a cam position sensor, a signal indicating the intake air flow rate, a throttle valve opening signal, a signal for an engine coolant, and the like, and outputs the ignition signal to the igniter-integrated ignition coil 808. Specifically, in ignition timing control, appropriate ignition timing is calculated by correcting, based on the signal from each sensor, the basic ignition timing computed in accordance with the state of the engine 120.

In addition, a throttle control system is introduced in this engine system. The throttle control system corrects, based on the signal from each sensor, the opening of the throttle valve 300 computed in accordance with the state of the engine 120, to obtaining an appropriate opening. In other words, the engine ECU 1000 controls the opening of the throttle valve 300 with the use of the throttle motor 304, such that an appropriate opening of the throttle valve 300 according to the combustion state in the engine 120 is obtained.

Hereinafter, a control structure for realizing a regenerative braking operation in the hybrid vehicle according to this embodiment is described with reference to FIG. 4.

Figure 4:
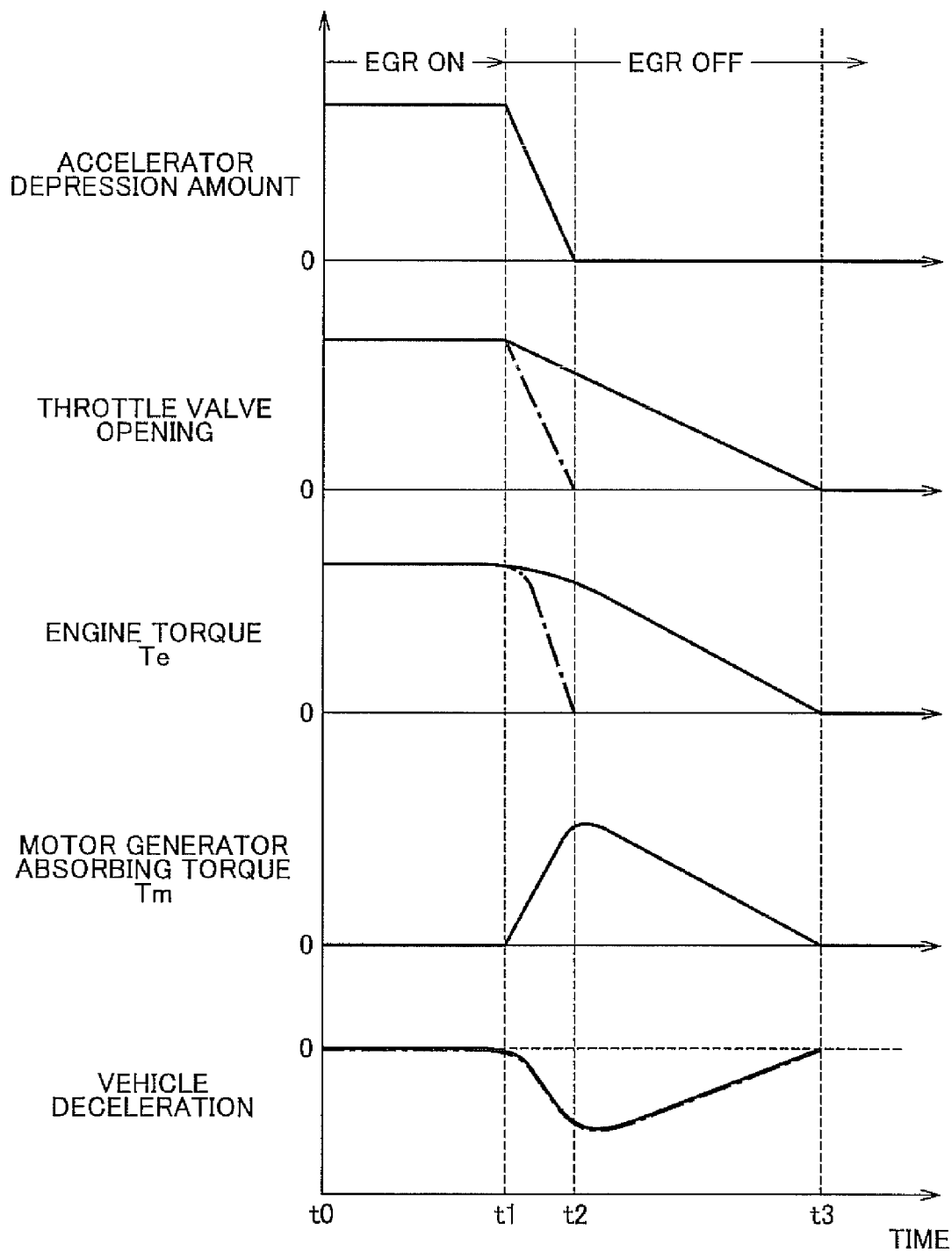
FIG. 4 is a diagram showing an example of temporal changes in an operating state of an engine and a motor generator (MG), which occur when a deceleration request is issued by a driver.

FIG. 4 is a diagram showing an example of temporal changes in the operating state of the engine 120 and the MG 140, which occur when a deceleration request is issued by a driver.

Referring to FIG. 4, first, suppose that a deceleration request from the driver is detected at a time t1. This deceleration request is generated when, for example, the driver releases an accelerator pedal 100 (FIG. 2). Note that the deceleration request includes a depressed amount of the accelerator pedal 100 and a depressed amount of a brake pedal (not shown).

In this embodiment, the deceleration request is detected by the HV_ECU 1030 and the engine ECU 1000 based on a signal from the accelerator position sensor 102 (FIG. 2). In FIG. 4 the accelerator pedal 100 is completely released and the accelerator depression amount is 0% at a time t2.

When the deceleration request is detected at the time t1, the engine ECU 1000 outputs a control signal (valve closing signal) to the EGR valve 502 (FIG. 3) to stop the activation of the EGR device (EGR off). As a result, the EGR valve 502 is completely closed and the introduction of the EGR gas into the intake pipe is blocked.

The engine ECU 1000 further executes valve closing control for completely closing the throttle valve 300 after the time t1.

Here, valve closing control that is performed on the throttle valve 300 assumes the situation where the valve closing speed of the throttle valve 300 is controlled to follow the deceleration speed of the accelerator depression amount. In this case, the amount of fresh air (fresh air) that is introduced into the intake pipe via the air cleaner 200 decreases at the deceleration speed corresponding to the valve closing speed of the throttle valve 300. As a result, the amount of intake air is restricted after the time t1, and consequently the EGR gas contained in the intake pipe remains within the intake pipe without being discharged into the combustion chamber by the fresh air. Especially during the activation of the EGR device between a time t0 and the time t1, when a large amount of EGR gas is recirculated in the intake system, that is, when an EGR rate indicating a rate of the EGR gas amount with respect to the amount of intake air introduced into the cylinder is increased, the possibility that the residual amount of the EGR gas in the intake pipe incases, as will be described hereinafter.

More specifically, a high EGR rate is effective in terms of reducing the amount of NOx and improving fuel efficiency, and is realized by increasing the diameter of the EGR pipe 500 (FIG. 3) and the size of the EGR valve 502 (FIG. 3).

On the other hand, by increasing the diameter of the EGR pipe 500 and the size of the EGR valve 502, a problem arises in that the control responsiveness in controlling the opening of the EGR valve 502 is reduced.

Therefore, in a case in which the deceleration request issued by the driver is detected, even when the engine ECU 1000 outputs a valve closing signal to the EGR valve 502, a predetermined response time period is required until the EGR valve 502 is actually completely closed. As a result, the EGR gas is continuously introduced into the intake pipe during the response time period. For this reason, when the amount of intake air is reduced by performing valve closing control on the throttle valve 300 and the negative pressure in the intake pipe rises, whereby the amount of recirculating EGR gas increases. Furthermore, the EGR gas recirculated into the intake pipe during the response time period remains in the intake pipe without being discharged into the combustion chamber by the introduced fresh air.

When an abnormality occurs by a foreign matter enters the EGR valve 502 due to age-related deterioration or the like, the amount of residual EGR gas likely to further increase because the accuracy of control of the opening of the EGR valve 502 is lowered.

Because the amount of combustible air substantially decreases as the residual amount of the EGR gas increases, a so-called misfire, which is a phenomenon in which the air-fuel mixture within the combustion chamber is not ignited, likely to occur when a combustible mixture ratio cannot be combusted. When a misfire occurs, the engine rotational speed drops, deteriorating the drivability. Another problem is that there is a negative impact on an exhaust emission control catalyst when unburned air-fuel mixture is discharged to the exhaust passage.

Furthermore, when the engine 120 is started (restarted), combustion speed within the combustion chamber slows down and the combustion becomes unstable, which results in decrease in the engine startability decreases or increase in exhaust emission.

Therefore, in order to solve these problems, the control apparatus for a hybrid vehicle according to this embodiment carries out valve closing control on the throttle valve 300 in accordance with a predetermined valve closing speed in response to the EGR rate and engine rotational speed, when the deceleration request issued by the driver is detected.

Figure 5:
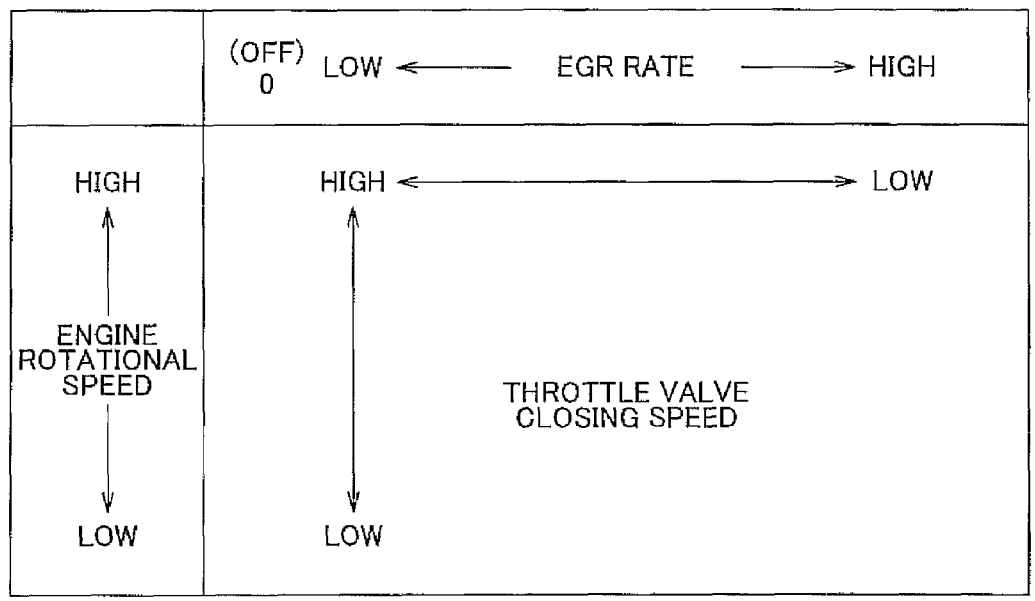
FIG. 5 is a diagram for illustrating the EGR rate and the relationship between the engine revolution speed and the valve closing speed of a throttle valve.

Specifically, in the configuration described above, the valve closing speed of the throttle valve 300 is set depending on the EGR rate and the engine rotational speed. FIG. 5 is a diagram for illustrating the EGR rate and the relationship between the engine rotational speed and the valve closing speed of the throttle valve 300.

Referring to FIG. 5, the valve closing speed of the throttle valve 300 is set to become low as the EGR rate increases. This is because a large amount of fresh air needs to be introduced into the intake pipe in order to remove the EGR gas from the intake pipe because the residual amount of the EGR gas increases as the EGR rate rises.

The valve closing speed of the throttle valve 300 is set to become high as the engine rotational speed increases. The reason is that, because introduction of the new air into the intake pipe is actively performed as the engine rotational speed increases, the EGR gas can be removed from the intake pipe even by closing the throttle valve 300 in a shorter period of time.

In this embodiment, the relationship between the EGR rate and the engine rotational speed, and the valve closing speed of the throttle valve 300 that are shown in FIG. 5 are defined beforehand by an experiment or the like, and then stored in the form of a valve closing speed setting map into a Read Only Memory (ROM) within the engine ECU 1000. As the throttle valve 300 closing speed, a value that corresponds to the EGR rate and the engine rotational speed that are obtained when the deceleration request from the driver is detected is derived from the map.

The valve closing speed setting map not only has the EGR rate and the engine rotational speed as parameters, but also may be in any form as long as it is capable of appropriately setting the valve closing speed in accordance with a result estimating the residual amount of the EGR gas.

As described above, by variably setting the valve closing speed of the throttle valve 300 in accordance with the EGR rate and the engine rotational speed, when the EGR rate is high the throttle valve 300 is closed at a valve closing speed that is below the deceleration speed of the accelerator depression amount, as shown by the solid lines in FIG. 4. Therefore, because only fresh air is introduced into the intake pipe after the EGR valve 502 is completely closed, the EGR gas is discharged from the intake pipe into the combustion chamber by the fresh air. As a result, combustion can be carried out stably and the influence on the drivability and the exhaust emission control catalyst can be improved. Further, the startability of the engine 120 can be prevented from being degraded.

On the other hand, by performing the abovementioned valve closing control on the throttle valve 300, a torque is generated from the engine 120 against the deceleration request issued by the driver. The generated engine torque Te gradually decreases at a speed proportionate to the valve closing speed of the throttle valve 300, as shown by the solid lines in FIG. 4, and eventually becomes zero. Therefore, due to this surplus torque, an unpredicted sense of movement (sense of idle running) of the vehicle is applied to the driver, degrading a sense of deceleration.

In order to achieve both improvement of fuel efficiency from a high EGR rate and the sense of deceleration, the control apparatus for a hybrid vehicle according to this embodiment is configured to control a regenerative braking torque of the MG 140 (FIG. 1) so that surplus engine torque Te is absorbed by the MG 140.

Specifically, as shown in FIG. 4, the power that is generated by the engine 120 at the time of deceleration (engine torque× engine rotational speed) is converted into a regenerative braking power of the MG 140. Accordingly, as is clear from FIG. 4, the characteristics that are substantially the same as those obtained when valve closing control is not performed on the throttle valve 300 according to the embodiment are obtained at a vehicle deceleration (this situation is shown by the dotted lines in the drawing). In other words, it is possible to ensure the sense of deceleration that is substantially the same as that obtained when valve closing control is not performed on the throttle valve 300 of the embodiment.

Figure 6:
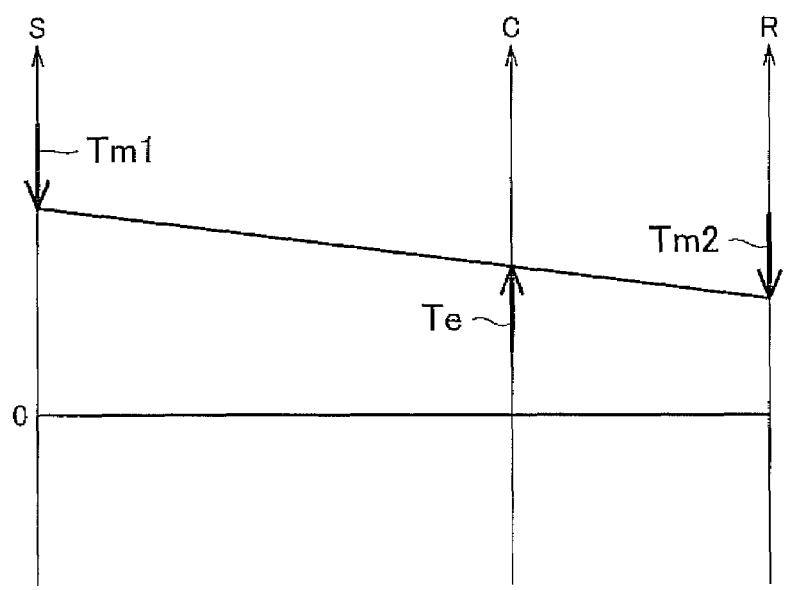
FIG. 6 is a diagram showing an example of a collinear diagram on the hybrid vehicle according to the embodiment of the invention.

FIG. 6 is a diagram showing an example of a collinear diagram on the hybrid vehicle according to the embodiment. Referring to FIG. 6, the vertical axis represents the rotational speed of each rotating shaft, and the horizontal axis represents the gear ratio between gears in terms of a distance.

A sun gear shaft (S in the diagram) and a ring gear shaft (R in the diagram) are placed on both ends, and a position C that internally divides the space between the position S and the position R into 1:ρ is taken as a carrier shaft. ρ is the ratio of the number of teeth of the sub gear to the number of teeth of the ring gear. The planetary gear has the characteristics that when the rotational speed of the rotating shaft of each of the gears is plotted to the positions S, C and R defined in the manner described above, the plotted three points are always aligned on the same straight line.

When the operating state of the hybrid vehicle during deceleration is expressed by the collinear diagram shown in FIG. 6, valve closing control described above is carried out on the throttle valve 300 to generate the engine torque Te on the carrier shaft. Then, absorbing torques Tm1, Tm2 of the MGs 140A, 140B are set so as to negate the engine torque Te. The set absorbing torques Tm1, Tm2 are added to a braking torque acting on each of the sun gear shaft and the ring gear shaft. As a result, the engine power is converted into the regenerative braking power of the MGs 140A, 140B, and recovered electricity is accumulated in the driving battery 220.

As described above, according to the control apparatus for a hybrid vehicle according to the embodiment, the power generated from the engine 120 during vehicle deceleration is absorbed by the MG 140 serving as another motive power source, whereby the sense of deceleration generated by realizing a high EGR rate can be prevented from being degraded. As a result, both improvement of fuel efficiency and the sense of deceleration can be attained.

Although the above has described the case where the engine torque Te is absorbed by both of the MGs 140A, 140B, the engine torque Te can be absorbed by either one of the MGs.

Figure 7:
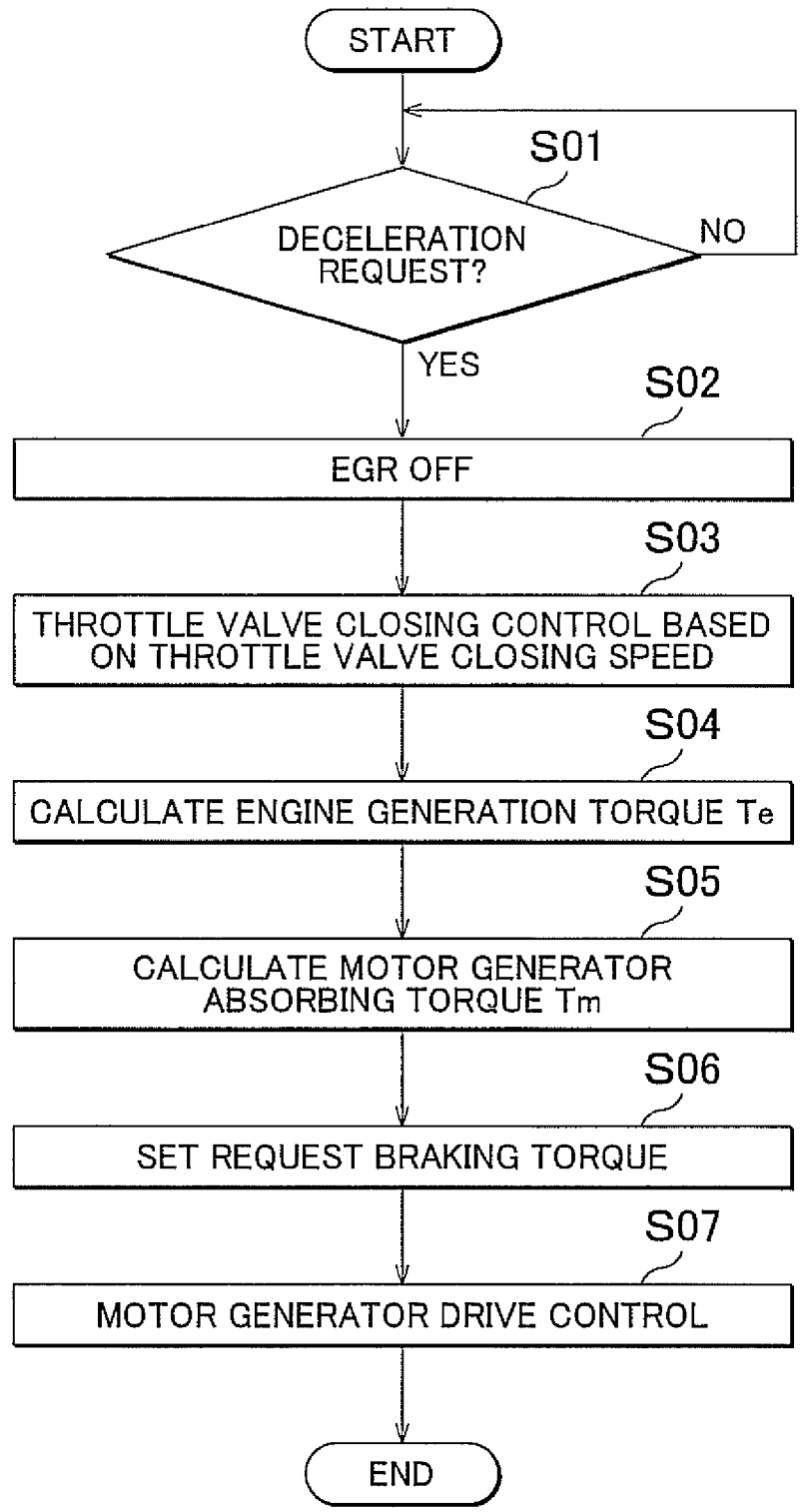
FIG. 7 is a flowchart showing a procedure for a regenerative braking operation performed by the hybrid vehicle according to the embodiment of the invention.

The processing described above can be put together into a processing flow shown in FIG. 7. FIG. 7 is a flowchart showing a procedure for a regenerative braking operation performed by the hybrid vehicle according to the embodiment.

Referring to FIG. 7, once a series of control is started, the HV_ECU 1030 and the engine ECU 1000 (FIG. 1) determine whether a deceleration request issued by the driver is detected or not, based on the signal from the accelerator position sensor 102 (step S01).

When the deceleration request from the driver is not detected (NO in step S01), the processing returns to the beginning.

When, on the other hand, the deceleration request is detected (YES in step S01), the engine ECU 1000 stops (turns off) the activation of the EGR device (step S02).

Further, the engine ECU 1000 executes valve closing control on the throttle valve 300 (FIG. 2). Specifically, the engine ECU 1000 refers to the valve closing speed setting map shown in FIG. 5, to derive the valve closing speed corresponding to the EGR rate and the engine rotational speed obtained upon detection of the deceleration request. The engine ECU 1000 then executes valve closing control on the throttle valve 300 to reduce the opening of the throttle valve 300, in accordance with the derived valve closing speed (step S03).

During the execution of valve closing control, the HV_ECU 1030 calculates the torque Te generated by the engine 120, on the basis of the signal from the airflow meter 202 that indicates the amount of intake air (step S04). When an output power of the engine 120 is calculated based on the calculated engine torque Te and the engine rotational speed detected by the engine rotational speed sensor, the HV_ECU 1030 further calculates an absorbing torque Tm of the MG 140 that is required for converting the output power of the engine 120 into the regenerative braking power of the MG 140 (step 505).

The HV_ECU 1030 then sets a request braking torque of the MG 140 based on the absorbing torque Tm of the MG 140 (step S06). The set request braking torque is applied to the MG_ECU 1010 (FIG. 1) as a torque command, and then the MG_ECU 1010 controls the MG 140 in accordance with the torque command (step S07).

As described above, during deceleration of the hybrid vehicle, the engine power that is generated during the execution of valve closing control of the throttle valve 300 is converted into the regenerative braking power of the MGs 140A, 140B, and the recovered electricity is accumulated in the driving battery 220.

Therefore, when the engine power generated during the execution of valve closing control increases as the valve closing speed of the throttle valve 300 is lowered due to a high EGR rate, the regenerative braking power of the MG 140 also increases. For this reason, the driving battery 220 is likely to be overcharged.

On the other hand, discharge of electricity from the driving battery 220 or charge of electricity to the driving battery 220 is carried out in consideration of a charge state (to be simply referred to as "SOC" hereinafter), because, by maintaining the SOC in an appropriate range, the driving battery 220 can be prevented from being overcharged or over-discharged.

Specifically, charge/discharge control of the driving battery 220 is performed by controlling an electric generation operation by the MG 140B such that the SOC of the driving battery 220 is kept within a predetermined range having a predetermined target control center value as the central value. Note that activation of the engine 120 is also started in response to the electric generation operation of the MG 140B.

Here, in order to accumulate the electricity regenerated by the MG 140 into the driving battery 220 during deceleration of the hybrid vehicle, it is desired that the driving battery 220 be charged low before starting the abovementioned regenerative braking operation. Therefore, the control apparatus for a hybrid vehicle according to this embodiment is configured, when the EGR device is in operation, that is, when the execution of control of the opening of the EGR, to change the target control center value of the SOC, which is an indicator of charge/discharge control performed on the driving battery 220, to a value lower than the target control center value of the SOC obtained when the EGR device is stopped, that is, when the execution of control of the opening of the EGR valve is prohibited.

Figure 8:
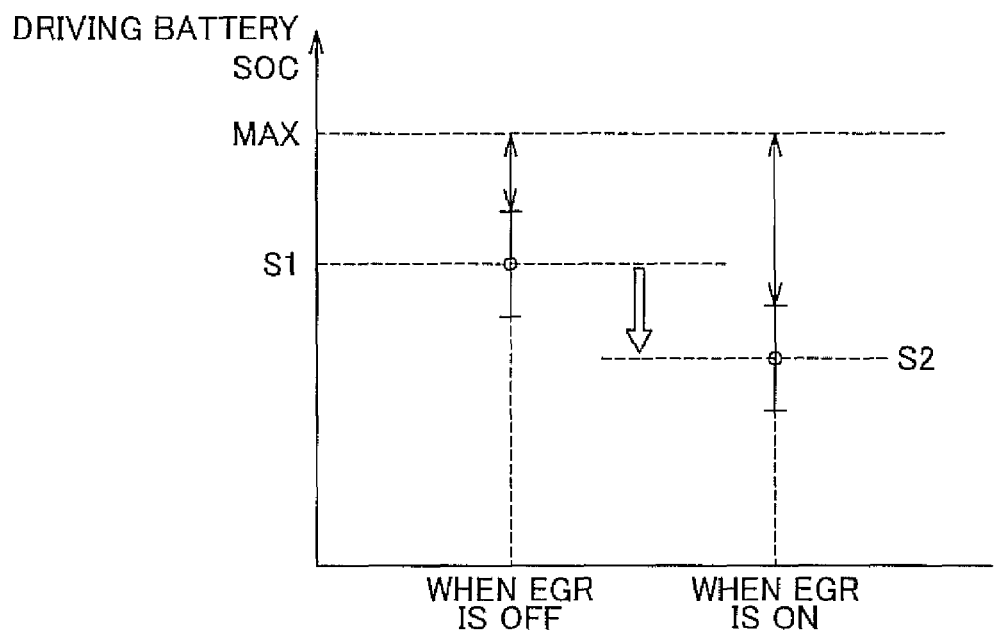
FIG. 8 is a diagram for illustrating charge/discharge control of a driving battery according to the embodiment of the invention.

Specifically, as shown in FIG. 8, when the EGR device is stopped (when the EGR is off), charge/discharge control is carried out on the driving battery 220 so that the SOC is kept within a predetermined range having S1 as the target control center value. On the other hand, during the activation of the EGR device (when the EGR is on), charge/discharge control is carried out on the driving battery 220 so that the SOC is kept within a predetermined range having S2 lower than S1, as the target control center value.

As a result, during the activation of the EGR device, as compared with the state in which the EGR device is stopped, the difference between the SOC of the driving battery 220 and the fully-charged state (corresponding to MAX in FIG. 8) increases, whereby the electricity that can charge the driving battery 220 increases. Therefore, when stopping the activation of the EGR device, the driving battery 220 can be prevented from being overcharged, by receiving the electricity regenerated by the MG 140 during the execution of valve closing control on the throttle valve 300.

Changing the target control center value of the SOC of the driving battery 220 illustrated in FIG. 8 can be realized by changing a switching threshold value for switching a travel mode of the hybrid vehicle between the time when the EGR device is activated and the time when the EGR device is stopped.

Specifically, the hybrid vehicle is configured to be able to travel by selecting an electric vehicle (EV) travel mode and an HV travel mode. In the EV travel mode, the hybrid vehicle travels only using the drive force received from the MG 140A. In this EV travel mode, the MG 140B that has received the drive force of the engine 120 does not carry out the electric generation operation, and electricity charging to the driving battery 220 is restricted.

In the HV travel mode, on the other hand, the hybrid vehicle controls the electric generation operation of the MG 140B so that the SOC of the driving battery 220 is kept within the predetermined range shown in FIG. 8. The engine 120 is also activated in response to the electric generation operation performed by the MG 140B. Note that a part of the drive force generated by activating the engine 120 is also used when running the vehicle.

In this embodiment, the travel mode switching threshold value for switching between the travel modes is changed so that the range where the vehicle travels in the EV travel mode expands during the activation of the EGR device.

For example, when a drive force request such as abrupt acceleration is issued by the driver while the vehicle runs in the EV travel mode, the engine 120 is activated so that the mode of the hybrid vehicle is switched to the HV travel mode. In so doing, a predetermined threshold value is set beforehand as the travel mode switching threshold value for the accelerator depression amount indicating the opening of the accelerator pedal, and when the accelerator depression amount exceeds this threshold value, the EV travel mode is switched to the HV travel mode. In this embodiment, the threshold value of the accelerator depression amount that indicates switching between the travel modes during the activation of the EGR device is changed to a value OP2 (>OP1) higher than a threshold value OP1 obtained when the EGR device is stopped. As a result, during the activation of the EGR device, the range in which the vehicle travels in the EV travel mode is enlarged.

It is possible to securely prevent the driving battery 220 from being overcharged during deceleration of the hybrid vehicle, by performing opening control of the EGR valve 502 (to be referred to as "EGR control" hereinafter) that will be described later, in addition to the abovementioned charge/discharge control of the driving battery 220.

Figure 9:
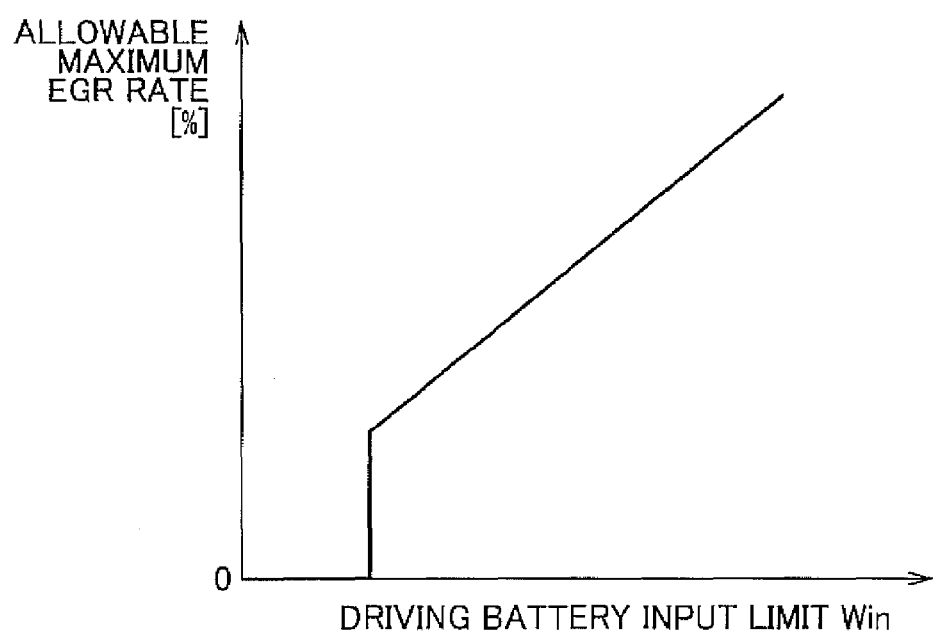
FIG. 9 is a diagram showing the relationship between the allowable maximum EGR rate and the input limit of the driving battery.

FIG. 9 is a diagram showing the relationship between the allowable maximum EGR rate, which is the maximum value of the EGR rate allowed in the EGR control, and the input limit Win, which is an upper limit of the electricity that can charge the driving battery 220.

In this embodiment, the engine ECU 1000 (FIG. 1) sets a target value of the EGR rate (target EGR rate) corresponding to a control target value of the amount of recirculating exhaust by taking the allowable maximum EGR rate as the upper limit on the basis of the operating state of the engine 120, and executes EGR control so that the actual EGR rate matches the target EGR rate.

In this EGR control, the engine ECU 1000 sets the allowable maximum EGR rate in accordance with the input limit Win of the driving battery 220. Note that the input limit Win of the driving battery 220 is set based on the battery temperature of the driving battery 220 detected by a temperature sensor (not shown) and the SOC of the driving battery 220, and the input limit Win is input through a communication from the battery ECU 1020 (FIG. 1).

Referring to FIG. 9, when the input limit Win of the driving battery 220 is lower than a predetermined value, the allowable maximum EGR rate is set at 0%, which is a value at which the EGR device is stopped. On the other hand, when the input limit Win is equal to or greater than the predetermined value, the allowable maximum EGR rate is set to a value that increases as the input limit Win increases.

Note that the relationship shown in FIG. 9 is derived beforehand by calculating the relationship between the EGR rate and the amount of electricity regenerated by the MG 140, based on the relationship between the EGR rate shown in FIG. 5 and the valve closing speed of the throttle valve 300. The relationship shown in FIG. 9 is stored in the form of an allowable maximum EGR rate setting map into the ROM provided in the engine ECU 1000, and the relationship that corresponds to the input limit Win of the driving battery 220 obtained when an EGR authorization condition for authorizing the activation of the EGR device is derived from this map.

According to this configuration, when the input limit Win of the driving battery 220 is relatively small, the allowable maximum EGR rate is set at a relatively low value or 0% (when the EGR is off). Therefore, because the amount of electricity generated by the MG 140 during the execution of valve closing control of the throttle valve is limited to a value that does not exceed the input limit Win of the driving battery 220, it is possible to prevent the driving battery 220 from being overcharged.

In addition, in this embodiment, when the SOC of the driving battery 220 that is input from the battery ECU 1020 becomes at least a predetermined threshold value, the engine ECU 1000 forcibly stops the EGR device. Note that the predetermined threshold value is set at an upper limit value of the SOC allowed for avoiding overcharge of the driving battery 220 (the fully-charged state).

According to this configuration, when, for example, the driving battery 220 is brought into the fully-charged state by the electricity regenerated by the MG 140 due to a continuous downhill slope, execution of the EGR control is prohibited. Therefore, since it is no longer necessary to execute the abovementioned valve closing control on the throttle valve 300, the driving battery 220 can be prevented from being overcharged.

Although there is concern that forcibly stopping the EGR device might be disadvantageous in fuel consumption, the abovementioned charge/discharge control of the driving battery 220 allows the vehicle to further travel in the EV travel mode because the driving battery 220 enters the fully-charged state. Therefore, the impact on fuel consumption can be minimized.

Figure 10:
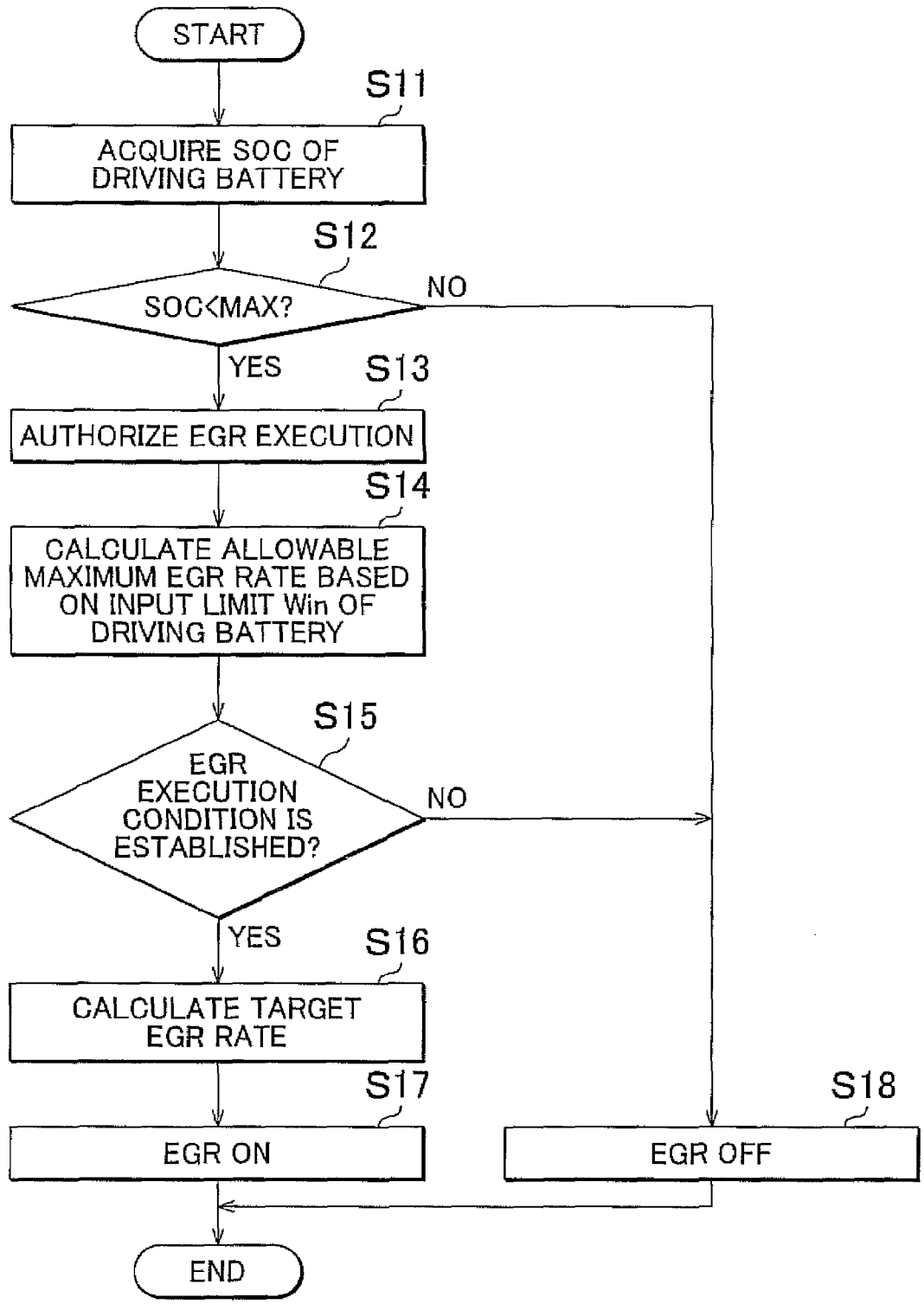
FIG. 10 is a flowchart showing a procedure for EGR control executed by the engine ECU according to the embodiment of the invention.
Figure 11:
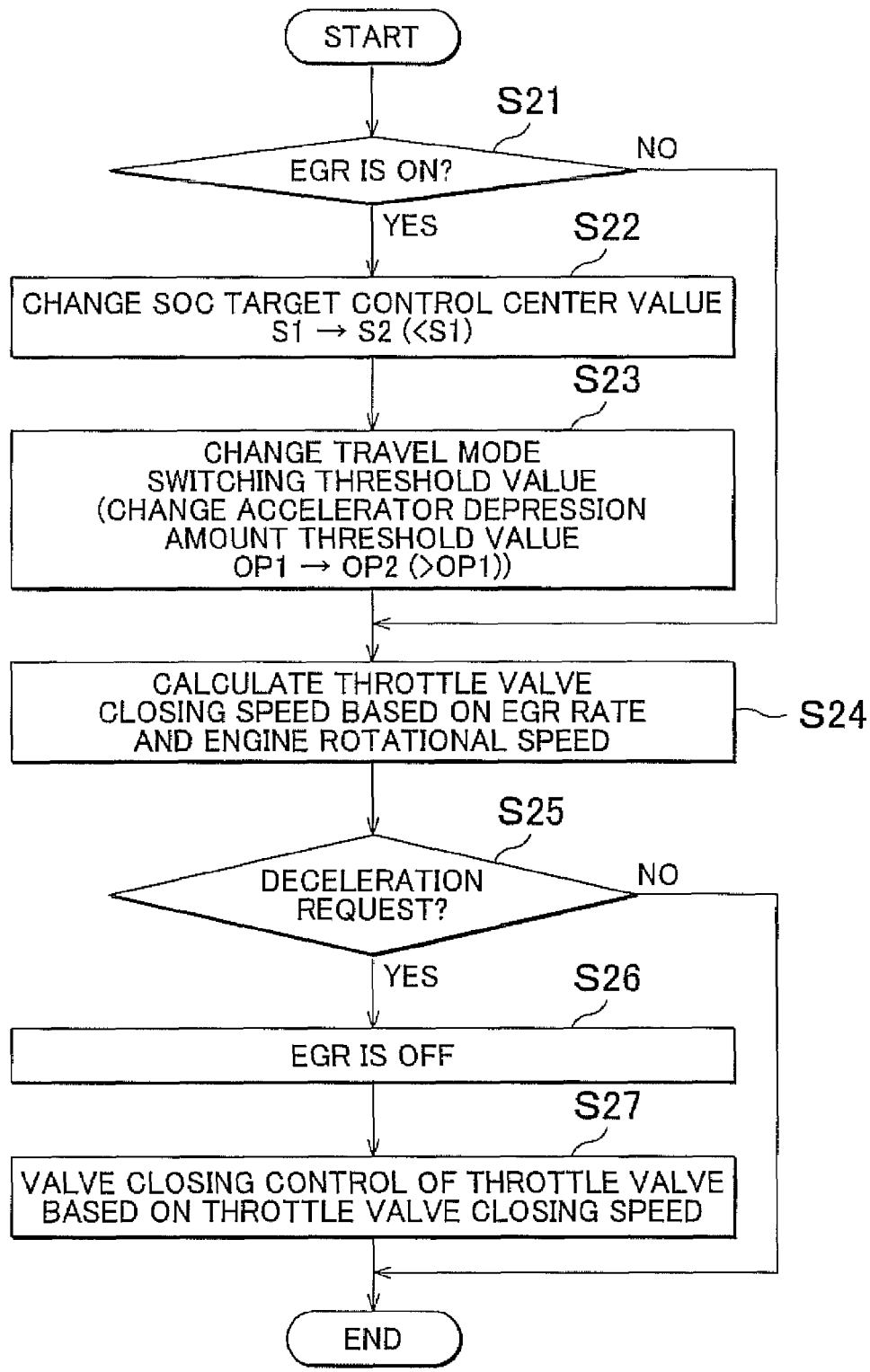
FIG. 11 is a flowchart showing a procedure for charge/discharge control of the driving battery and valve closing control of the throttle valve that are executed by a HV_ECU and the engine ECU according to the embodiment of the invention.

The processing described above can be put together into the processing flows shown in FIGS. 10 and 11. FIG. 10 is a flowchart showing a procedure for EGR control executed by the engine ECU 1000 according to the embodiment.

Referring to FIG. 10, once a series of control is started, the engine ECU 1000 acquires the SOC of the driving battery 220 from the battery ECU 1020 (step S11). The engine ECU 1000 then determines whether the SOC of the driving battery 220 falls below a predetermined threshold value or not (step S12). In this embodiment, the predetermined threshold value is set to, for example, the fully-charged state of the driving battery 220 (corresponding to MAX in FIG. 8).

When the SOC of the driving battery 220 is equal to or greater than the predetermined threshold value MAX (NO in step S12), the engine ECU 1000 stops (turns off) the EGR device (step S18).

On the other hand, when the SOC of the driving battery 220 falls below the predetermined threshold value MAX (YES in step S12), the engine ECU 1000 activates the EGR device (step S13). The engine ECU 1000 then refers to the allowable maximum EGR rate setting map shown in FIG. 9, to calculate the allowable maximum EGR rate based on the input limit Win of the driving battery 220 that is input from the battery ECU 1020 (step S14).

Next, the engine ECU 1000 determines whether or not the operating state of the engine 120 satisfies a predetermined condition for activating the EGR device (EGR execution condition), on the basis of the data such as the throttle opening detected by each sensor, the amount of intake air, the engine rotational speed, and the temperature of the coolant (step S15).

When the operating state of the engine 120 does not satisfy the EGR execution condition (NO in step S15), the engine ECU 1000 stops the EGR device (step S18).

On the other hand, when the operating state of the engine 120 satisfies the EGR execution condition (YES in step S15), the engine ECU 1000 calculates the target EGR rate based on the operating state of the engine 120, with the allowable maximum EGR rate calculated in step S14 as the upper limit (step S16). The engine ECU 1000 then starts activating the EGR device, and executes opening control of the EGR valve so that the actual EGR rate matches the target EGR rate (step S17).

FIG. 11 is a flowchart showing a procedure for charge/discharge control of the driving battery 220 and valve closing control of the throttle valve that are executed by the HV_ECU 1030 and the engine ECU 1000 according to the embodiment.

Referring to FIG. 11, once a series of control is started, the HV_ECU 1030 determines whether the EGR device is being activated or not (step S21). Note that the determination to be made in step S21 is performed by acquiring an EGR activation determination flag for instructing by the HV_ECU 1030 activation/stoppage of the EGR device from the engine ECU 1000.

When the EGR device is stopped (NO in step S21), the HV_ECU 1030 advances the processing to step S24.

When, on the other hand, the EGR device is being activated (YES in step S21), the HV_ECU 1030 changes the target control center value of the SOC of the driving battery 220 to the value S2 (<S1) that is lower than the target control center value S1 of the SOC obtained when the EGR device is stopped (step S22).

The HV_ECU 1030 further compares the travel mode switching threshold value of the hybrid vehicle with a travel mode switching threshold value obtained when the EGR device is stopped, and changes it so that the range where the vehicle travels in the EV travel mode expands (step S23). For example, the HV_ECU 1030 changes the threshold value of the accelerator depression amount indicating switching between the travel modes, to the value OP2 (>OP1) higher than the threshold value OP1 obtained when the EGR device is stopped.

Next, the engine ECU 1000 refers to the valve closing speed setting map shown in FIG. 5 to calculate the valve closing speed of the throttle valve 300 corresponding to the EGR rate and the engine rotational speed (step S24). The engine ECU 1000 then determines, based on a signal from the accelerator position sensor 102, whether the deceleration request issued by the driver is detected or not (step S25). When the deceleration request from the driver is not detected (NO in step S25), the processing is returned to step S24.

On the other hand, when the deceleration request is detected (YES in step S25), the engine ECU 1000 stops the activation of the EGR device (step S26).

Moreover, the engine ECU 1000 executes valve closing control on the throttle valve 300. Specifically, the engine ECU 1000 executes valve closing control on the throttle valve 300 such that the opening of the throttle valve 300 is reduced in accordance with the valve closing speed corresponding to the EGR rate and engine rotational speed obtained upon detection of the deceleration request (step S27).

Note that the engine 120 can correspond to "internal combustion engine" of this invention, the MG 140 to "first and second MGs," and the EGR device to "exhaust gas recirculation device." In addition, the engine ECU 1000 may realize a "recirculating gas control portion" and "throttle control portion," and the HV_ECU 1030 may realize "braking control portion." Each of functional blocks configuring these parts has been described as a part functioning as software that is realized when a central processing unit (CPU) corresponding to the "control apparatus" of the invention executes a program stored in a storage unit, but each functional block may be realized by hardware. Note that such a program is recorded in a recording medium and installed in the vehicle.

The throttle control portion described in the invention may set the deceleration speed at a relatively low value when the amount of recirculating exhaust recirculated by the EGR device is relatively large.

The throttle control portion described in the invention may set the deceleration speed at a relatively high value when the rotational speed of the internal combustion engine is relatively high.

The control apparatus according to the invention may further have a state estimation portion that estimates a charge state of an electric storage device, a temperature detection portion that detects the temperature of the electric storage device, and an input limit setting portion that sets, based on the estimated charge state and the detected temperature, an input limit as an upper limit of electricity that can charge the electric storage device. When the set input limit is relatively large, a recirculating gas control portion may set the maximum allowable recirculating amount, which is the maximum allowable amount of the exhaust gas that can be recirculated into the intake pipe, to a relatively high value.

The control apparatus according to the invention may further have a charge control portion that controls charging performed by the first MG onto the electric storage device, such that the charge state of the electric storage device is kept within a predetermined range having a predetermined control center value as a central value. During the execution of valve opening control on a recirculation valve, the charge control portion may set the target control center value at a value lower than the target control center value obtained when the execution of valve opening control on the recirculation valve is prohibited.

The vehicle according to the invention may be able to travel by selecting either one of the travel modes of a first mode in which charging performed by the first MG on the electric storage device is restricted, and a second mode in which charging performed by the first MG on the electric storage device is controlled such that the charge state of the electric storage device is kept within the predetermined range. The control apparatus may further have a travel control portion that switches between the travel modes based on a traveling state of the vehicle. During the execution of valve opening control of the recirculation valve, the travel control portion may change the travel mode switching threshold value so that the range where the vehicle travels in the first mode expands.

The recirculating gas control portion according to the invention may completely close the recirculation valve during the execution of valve opening control of the recirculation valve, when the estimated charge state exceeds a predetermined threshold value.

The throttle control portion according to the invention may compare the rate of change of the throttle valve with the rate of change of the depressed amount of the accelerator pedal of the hybrid vehicle, and lowers the rate of change of the throttle valve.

The braking control portion according to the invention may control regenerative braking forces of the first and second MGs so that at least one of the first and second MGs absorbs a surplus of the motive power generated by the internal combustion engine.

While the invention has been described with reference to an example embodiment thereof, it is to be understood that the invention is not limited to the described embodiment or constructions. To the contrary, the invention is intended to cover various modifications and equivalent arrangements. In addition, while the various elements of the example embodiment are shown in various combinations and configurations, other combinations and configurations, including more, less or only a single element, are also within the scope of the invention.

What is claimed is:

1. A control apparatus for a hybrid vehicle, which outputs motive power to a drive shaft with the use of an engine and a motor generator as motive power sources, wherein
    the engine is provided with an exhaust gas recirculation device for recirculating part of exhaust gas to an intake pipe of the engine via a recirculation valve, and is provided with a throttle valve that changes an amount of air circulating through the intake pipe,
    the control apparatus comprising:
    a control portion,
    wherein when a deceleration request issued by a driver is detected, the control portion executes first valve closing control to close the recirculation valve and second valve closing control to close the throttle valve so that the throttle valve is closed after the recirculation valve is fully closed,
    wherein the control portion controls the motor generator to absorb an excessive torque produced by the engine due to the second valve closing control by regeneration.

2. The control apparatus according to claim 1, wherein, in the second valve closing control, the control portion sets a speed of closing the throttle valve at a relatively low value when the amount of recirculating exhaust recirculated by the exhaust gas recirculation device is relatively large.

3. The control apparatus according to claim 2, wherein, in the second valve closing control the control portion sets the speed of closing the throttle valve at a relatively high value when a rotational speed of the engine is relatively high.

4. The control apparatus according to claim 1, wherein the control portion sets the speed of closing the throttle valve at a relatively high value when a rotational speed of the engine is relatively high.

5. The control apparatus according to claim 1, further comprising:
    an electric storage device capable of sending and receiving power to and from the motor generator;
    a state estimation portion that estimates a charge state of the electric storage device;
    a temperature detection portion that detects a temperature of the electric storage device; and
    an input limit setting portion that sets, based on the estimated charge state and the detected temperature, an input limit as an upper limit of power that can charge the electric storage device,
    wherein, in controlling opening of the recirculation valve, when the set input limit is relatively large, the control portion sets a maximum allowable recirculating amount, which is a maximum allowable amount of the exhaust gas that can be recirculated into the intake pipe, to a relatively high value.

6. The control apparatus according to claim 5, further comprising a charge control portion that controls charging performed by the motor generator onto the electric storage device, such that the charge state of the electric storage device is kept within a predetermined range having a predetermined target control center value as a central value,
wherein during the execution of valve opening control on the recirculation valve, the charge control portion sets the target control center value at a value lower than the target control center value obtained when the execution of valve opening control on the recirculation valve is prohibited.

7. The control apparatus according to claim 6, wherein
the vehicle is capable of traveling by selecting one of travel modes of a first mode in which charging performed by the motor generator on the electric storage device is restricted, and a second mode in which charging performed by the motor generator on the electric storage device is controlled such that the charge state of the electric storage device is kept within the predetermined range;
the control apparatus further includes a travel control portion that switches between the travel modes based on a traveling state of the vehicle; and
during the execution of valve opening control of the recirculation valve, the travel control portion changes a travel mode switching threshold value so that a range where the vehicle travels in the first mode expands.

8. The control apparatus according to claim 6, wherein the control portion completely closes the recirculation valve during the execution of valve opening control of the recirculation valve, when the estimated charge state exceeds a predetermined threshold value.

9. The control apparatus according to claim 8, wherein the predetermined threshold value represents a fully-charged state of the electric storage device.

10. The control apparatus according to claim 1, further comprising a charge control portion that controls charging performed by the motor generator onto the electric storage device such that the charge state of the electric storage device is kept within a predetermined range having a predetermined target control center value as a central value,
wherein during the execution of valve opening control on the recirculation valve, the charge control portion sets the target control center value at a value lower than the target control center value obtained when the execution of valve opening control on the recirculation valve is prohibited.

11. The control apparatus according to claim 1, wherein the deceleration request is detected as a result of a decrease in a depressed amount of an accelerator pedal of the hybrid vehicle.

12. The control apparatus according to claim 1, wherein the deceleration request is detected as a result of detection of depression of a brake pedal of the hybrid vehicle.

13. The throttle control apparatus according to claim 1, wherein the control portion compares a rate of change of the throttle valve with a rate of change of the depressed amount of the accelerator pedal of the hybrid vehicle, and lowers the rate of change of the throttle valve.

14. The control apparatus according to claim 1, wherein the control portion controls the regenerative braking forces of the motor generators so that the motor generators absorb a surplus of the motive power generated by the engine.

15. A control method for a hybrid vehicle, which outputs motive power to a drive shaft with the use of an engine and a motor generator as motive power sources, wherein
the engine is provided with an exhaust gas recirculation device for recirculating part of exhaust gas to an intake pipe of the engine again via a recirculation valve, and is provided with a throttle valve that changes the amount of air circulating through the intake pipe,
the control method comprising:
when a deceleration request issued by a driver is detected,
performing valve closing control to close the recirculation valve and second valve closing control to close the throttle valve so that the throttle valve is closed after the recirculation valve is fully closed; and
controlling the motor generator to absorb an excessive torque produced by the engine due to the second valve closing control by regeneration.

16. The control apparatus according to claim 1, wherein the hybrid vehicle has:
a first motor generator capable of generating electricity by receiving the motive power from the engine;
a motive power dividing mechanism that is configured to mechanically distribute the motive power from the engine to the generator and the drive shaft; and
a second motor generator, a rotating shaft of which is coupled to the drive shaft.

* * * * *

UNITED STATES PATENT AND TRADEMARK OFFICE
CERTIFICATE OF CORRECTION

| | | |
|---|---|---|
| PATENT NO. | : 8,290,652 B2 | Page 1 of 1 |
| APPLICATION NO. | : 12/562238 | |
| DATED | : October 16, 2012 | |
| INVENTOR(S) | : Kuniaki Niimi | |

It is certified that error appears in the above-identified patent and that said Letters Patent is hereby corrected as shown below:

In the Specification

Col. 10, line 61: replace "(step 505)" with --(step S05)--

Signed and Sealed this
First Day of April, 2014

Michelle K. Lee
*Deputy Director of the United States Patent and Trademark Office*